3,255,251
PROCESS FOR PREPARING TETRAALKYL THIURAM DISULFIDES

William Budd, Cuyahoga Falls, Ohio, assignor to The Goodyear Tire & Rubber Company, Akron, Ohio, a corporation of Ohio
No Drawing. Filed Feb. 21, 1964, Ser. No. 346,415
11 Claims. (Cl. 260—567)

This invention relates to the preparation of tetraalkyl thiuram disulfides, and more particularly concerns an improved process for the nitrite oxidation of an alkali metal dialkyl dithiocarbamate to the corresponding tetraalkyl thiuram disulfide.

Tetraalkyl thiuram disulfides, widely used in the vulcanization of rubber, are conventionally made by oxidizing an alkali metal salt of a dialkyl dithiocarbamic acid. Suggested oxidizing agents have included peroxides, free halogens, hypochlorites, ozone, and various nitrites. Agents other than the nitrites tend to be relatively expensive, difficult to handle, and productive of either low yields, inadequate purity, or both. The art has consequently turned to nitrite oxidation as a route to the tetraalkyl thiuram disulfide.

Although nitrite processes have received much attention, even the best of these present limitations regarding product yields and purity and particularly, slow reaction times. Nitrite oxidations are generally conducted at a neutral or slightly acid or alkaline pH, where the reaction requires several hours for completion. Attempts to speed the reaction by reducing the pH have met with difficulty, as an acid medium normally tends to favor the formation of oxidation by-products of no commercial value. An object of the invention is to provide an improved nitrite oxidation process having a materially decreased reaction time but without attendant formation of undesirable by-products.

Another object is to provide said process which, under optimum conditions of practice, affords a yield in excess of 95 percent of theoretical, with a corresponding decrease in unit consumption of expensive alkali metal dialkyl dithiocarbamate.

A limitation on present nitrite processes is their inability to produce tetraalkyl thiuram disulfides which are white in color and which are essentially free of all contaminants. For rubber used in the manufacture of electrical insulation, such purity is essential. A further object is to provide a process for making tetraalkyl thiuram disulfide of such quality.

A practical test of tetraalkyl thiuram disulfide suitability is its ease of dispersion in unvulcanized rubber. Unless the disulfide can dissolve or disperse readily, it is difficult to prepare a homogeneous masterbatch and a uniform vulcanizate. Still another object is to provide a process for making readily dispersible tetraalkyl thiuram disulfides.

Still another object of the invention is to provide a continuous oxidation process for the nitrite oxidation of alkali metal dialkyl dithiocarbamate characterized by superior control over reaction variables and the consequent production of higher quality, more uniform, product.

An important object is to provide a nitrite oxidation process which permits the regeneration, recovery, and recycle of nitrogen oxides.

Other and more particular objects and advantages will become apparent as the description of the invention proceeds.

The present invention is based in part on the discovery that excellent yields and purity and extremely rapid reaction rates, substantially without the formation of deleterious by-products, are obtained by conducting the oxidation at a very low pH if the dithiocarbamate reactant and the nitrite oxidant are introduced into an intensely agitated portion of the reaction zone. By this procedure, the alkali metal dialkyl dithiocarbamate is immediately oxidized to the corresponding tetraalkyl thiuram disulfide before any substantial by-product formation occurs.

The process according to the invention commences with the step of continuously introducing into a reaction zone a dilute aqueous solution of a mineral acid, in an amount sufficient to maintain a pH in the zone, and in the effluent from the zone, below about four. At least a portion of the reaction zone is intensely agitated, as by the use of turbine agitators, to disperse a second dilute aqueous solution introduced into the reaction zone and containing the alkali metal dialkyl dithiocarbamate reactant and the nitrite oxidant. This combination of agitation in an acid medium provides an environment favoring rapid oxidation of the dithiocarbamate to the desired tetraalkyl thiuram disulfide without substantial by-product formation.

According to a highly advantageous embodiment of the invention, a molecular oxygen-containing gas such as technically pure oxygen or air is continuously introduced into the reaction zone to regenerate a substantial portion of the nitrogen oxides consumed during oxidation. This permits excess nitrogen oxides to be recovered from the reaction zone effluent and cycled back to the zone for reuse.

The following equations describe an overall reaction according to the invention for oxidizing sodium dimethyl dithiocarbamate to tetramethyl thiuram disulfide, using a sodium nitrite oxidant and sulfuric acid as the mineral acid:

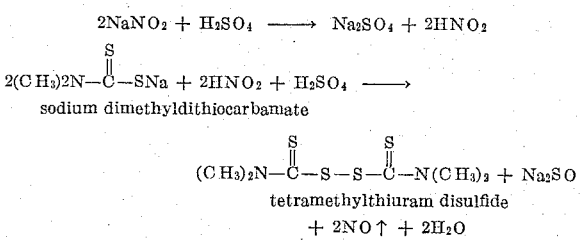

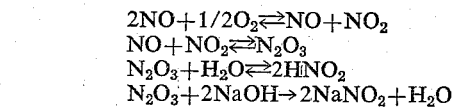

When an oxygen-containing gas is present, the following additional reactions may take place:

$$2NO + 1/2 O_2 \rightleftharpoons NO + NO_2$$
$$NO + NO_2 \rightleftharpoons N_2O_3$$
$$N_2O_3 + H_2O \rightleftharpoons 2HNO_2$$
$$N_2O_3 + 2NaOH \rightarrow 2NaNO_2 + H_2O$$

Where reference is made to theoretical quantities of oxygen or of nitrite, it is assumed that the indicated material is the sole oxidant.

The process of the invention is suitable for oxidizing any of the alkali metal dialkyl dithiocarbamates to the corresponding tetraalkyl thiuram disulfides. Generally, the alkali metal moiety is sodium, for reasons of economy, but in particular circumstances may be potassium or the other alkali metals. The dialkyl groups may be the same or different alkyl radicals, generally the lower alkyls having from 1 to about 4 carbon atoms in a primary, secondary, or tertiary configuration. The dimethyl and diethyl reactants are of major interest in the rubber industry, but the di-isopropyl, di-n-butyl, and di-isobutyl reactants have also been suggested. The alkyl groups may be of greater than four carbon atoms in size, illustrated by octyl and decyl.

The nitrite oxidant is any substance which affords a nitrite group to react with, and oxidize, the alkali metal dialkyl dithiocarbamate. Sodium nitrite is the oxidant most advantageously employed, but other alkali metal nitrites, or nitrite derivatives such as the lower alkyl nitrites (Olin et al. U.S. 2,325,194) may be used if desired.

The presence of a mineral acid is also required for the oxidation. Sulfuric acid is the acid of choice, but others such as hydrochloric acid may be substituted in whole or in part for sulfuric acid.

As stated earlier, two dilute aqueous solutions are continuously admitted into the reaction zone, the first constituting a mineral acid in an amount sufficient to maintain a pH throughout the zone below about 4.0, and the second composed of dithiocarbamate reactant and nitrite oxidant. The concentrations and relative proportions of these solutions are not critical but nonetheless are quite important from the standpoint of realizing optimum benefits from the present invention. Where the mineral acid is sulfuric, it is best used at a concentration of from about 3 to about 20 percent by weight, and in an amount sufficient to provide at least about 90 percent (optimally at least about 95 percent) of the theoretical requirement. Higher acid concentrations within the foregoing range tend to favor higher yields and purities, but are rarely necessary in view of the inherently high yield and purity of the present process, and in view of the processing advantages realized by recovering the tetraalkyl thiuram disulfide as a dilute slurry. Further, a very dilute mineral acid solution facilitates the maintaining of a low reaction temperature without the need for internal cooling coils or the like.

Sodium nitrite should be used in an amount corresponding to at least about 70 percent of theoretical, optimally an amount corresponding to about 87 to about 110 percent of theoretical. When an oxygen-containing gas such as technically pure oxygen, air, or oxygen-enriched air is employed, best results are obtained when from about 20 to about 50 percent of theoretical oxygen is present. Within the preferred ranges of sodium nitrite and oxygen proportions, it is generally possible to obtain a yield of at least about 90 percent when air is the oxygen-containing gas, and at least about 97 percent when pure oxygen is used.

One of the most striking advantages of the invention is in the reduction of time necessary to achieve substantially complete reaction. The prior art refers to reaction times generally on the order of hours (e.g., British Patent 374,594), but with the present invention the reaction time is usually less than 4 or 5 minutes, and under optimum practice is significantly less than even 2 minutes, for example about 0.1–0.2 minute. Consequently, the reaction zone need only be a small fraction of the size of prior art reactors, with corresponding savings in equipment investment and maintenance costs.

Reaction zone temperatures may be varied rather widely, and may range from as low as about −20° C. to as high as about 50° C. Preferred reaction temperatures are in the range of about 10 to about 30° C., optimally from about 15 to about 22° C.

A most important variable in reaction system, and the one providing a key to high yields and quality at rapid rates without significant by-product formation, is the maintenance of at least a portion of the reaction zone under intense agitation conditions. Agitation must be rapid enough so that when the solution of dithiocarbamate and nitrite is introduced into the reactor, the solution will be dispersed and reacted before substantial by-product formation reactions can take place. No precise correlation can be given for the requisite degree of agitation, as this will vary with reactor size and dimensions, but in general the agitation should be so intense that only an insubstantial amount of by-product, for example not more than about 5 percent of reactant, and preferably not more than about 2 percent of reactant, is produced.

Such intensive agitation may be achieved by providing a flat-bladed turbine impeller and by disposing the solution introduction conduit as near as possible to the outer periphery of the turbine. Alternatively, both solutions may be introduced as high pressure jets focused at a common juncture.

The tetraalkyl thiuram disulfide product is discharged from a reaction zone in the form of a dilute slurry or suspension in the reaction mixture. It may be recovered by filtration or like solids-liquid separation technique, washed in water and dried. When tetramethyl thiuram disulfide is being made, its melting point is almost invariably above about 150° C. and is often above about 155° C. A commonly accepted commercial specification for tetramethyl thiuram disulfide is a melting point of not below 142° C.

When a molecular oxygen-containing gas is employed in the process, the effluent reaction mixture will contain excess nitrogen oxides. These may be separated merely by agitating the mixture and collecting evolved nitrogen oxides. A scrubber, fed with either water or an alkali metal hydroxide solution, recovers the nitrogen oxides, and the resultant material may be recycled back to the oxidation reaction zone for reuse.

The invention, in its various aspects and embodiments, is further illustrated in the following examples, which are descriptive and exemplary but are not intended to be wholly definitive with respect to scope or conditions.

*Example 1*

This example illustrates the preparation of tetramethyl thiuram disulfide by oxidizing sodium dimethyl dithiocarbamate with sodium nitrite in the presence of sulfuric acid. Technically pure oxygen gas is admitted into the reaction zone at the rates shown.

The reaction zone is defined by a vertically disposed cylindrical reactor having internal dimensions of five inches in diameter and 6½ inches high; the bottom head is slightly conical in shape, and the resultant reactor has a volume of 0.396 gallon.

An axial impeller extends downward from the top head, terminating in a 6-bladed impeller rotating in a plane 1½ inches above the bottom apex of the conical head. Each blade is square in shape, 1½ inches in each dimension. The outer periphery of the agitator is 3 inches in diameter.

Oxygen gas and the dilute sulfuric acid solution, termed solution "A," are admitted through an axial conduit at the bottom of the reactor; this conduit is ¼ inch pipe. The second dilute aqueous solution, solution "B," is composed of sodium dimethyl dithiocarbamate and sodium nitrite and is introduced through a ¼ inch tubing conduit entering the reactor radially at the plane of rotation of the agitator, and exending ⅜ inch into the reactor.

In the table below, describing reaction conditions, sodium dimethyl dithiocarbamate concentration in units of weight percent may be obtained by multiplying "weight percent available tetramethyl thiuram disulfide in solution" by 1.192.

The following data are obtained:

TABLE I

| | Run Number | | | | |
|---|---|---|---|---|---|
| | 1 | 2 | 3 | 4 | 5 |
| Solution "A": | | | | | |
| Composition, wt. percent Sulfuric Acid | 15 | 15 | 5 | 5 | 10 |
| Charge rate, ml./min | 352 | 4,847 | 582 | 4,384 | 741 |
| Solution "B": | | | | | |
| Composition, g. NaNO$_2$ per 1,000 g. solution | 97.6 | 97.6 | 98.8 | 61.8 | 79.4 |
| Composition, wt. percent available tetramethyl thiuram disulfide in solution | 15.95 | 15.95 | 15.40 | 15.19 | 15.19 |
| Charge rate, ml./min | 407 | 5,158 | 201 | 1,826 | 647 |
| Oxygen Flow, c.f.m. at 70° F. and 1 atm | 0.054 | 0.691 | 0.020 | 0.413 | 0.087 |
| Residence time of reactants in reactor, minutes | 1.98 | 0.15 | 1.92 | 0.24 | 1.08 |
| Speed of agitator, r.p.m | 1,280 | 1,280 | 1,280 | 1,280 | 1,280 |
| Reaction temperature, °C | 22–26 | 14–18 | 16–20 | 24 | 22–26 |
| pH of slurry leaving reactor | 2–3 | 2–4.0 | 2.4–2.8 | 2 | 2–3 |
| Product yield, wt. percent | 96.2 | 93.6 | 99.2 | 97.3 | 94.4 |
| Overall Material Balance, Loss wt. percent | 2.1 | 1.6 | 0.7 | 4.6 | 2.8 |
| Percent of theoretical NaNO$_2$ | 105 | 105 | 110 | 70 | 90 |
| Percent of theoretical Oxygen | 47.8 | 48.2 | 37.0 | 82.6 | 50.0 |
| Percent of theoretical sulfuric acid | 109 | 118 | 116 | 116 | 104 |
| Production rate: lbs. per hr. per gal. reactor volume | | 252 | 10.0 | 91.6 | 30.9 |
| Product Concentration in slurry leaving reactor, wt. percent | | 7.1 | 3.7 | 4.4 | 6.4 |

| | Run Number | |
|---|---|---|
| | 1 | 2 |
| Product Evaluation: | | |
| Dispersion [a] | Very good | Very good |
| Chloroform, Insoluble wt. percent | 0.25 | none |
| Moisture, wt. percent | 0.38 | 0.24 |
| Melting Point, °C | 152–155 | 154–157 |
| Ash, wt. percent | 0.114 | Trace |
| Color [b] | 1 | 4 |

[a] Visual rating of rubber tailing after mixing with pigmented smoked sheet rubber on differential mill.
[b] Visual rating; normal commercial product is 6, white crystals are 1.

*Example II*

This example illustrates the substitution of air for pure oxygen, but in all other respects parallels the procedure and equipment used in conjunction with Example I. It is particularly noted that Run No. 7 below employs no oxygen-containing gas.

TABLE II

| | Run Number | | | |
|---|---|---|---|---|
| | 6 | 7 | 8 | 9 |
| Solution "A": | | | | |
| Composition, wt. and Sulfuric Acid | 25 | 25 | 25 | 25 |
| Charge rate, ml./min | 191 | 175 | 1,733 | 2,758 |
| Solution "B": | | | | |
| Composition, g. NaNO$_2$ per 1000 g. solution | 67.4 | 102.7 | 102.7 | 73.3 |
| Composition, wt. percent available tetramethyl thiuram disulfide in solution | 15.34 | 16.83 | 16.83 | 16.83 |
| Charge rate, ml./min | 432 | 410 | 4,177 | 4,378 |
| Air flow, c.f.m. at 70° F. and 1 atm | 0.35 | 0.00 | 2.54 | 2.64 |
| Residence time of reactants in reactor, minutes | 2.4 | 2.6 | 0.25 | 0.21 |
| Speed of agitator, r.p.m | 1,650 | 1,650 | 320 | 320 |
| Reaction temperature, °C | 38–41 | 34–35 | 32 | |
| pH of slurry leaving reactor | 3–5 | 2–5 | 3.5–4.0 | 2 |
| Product yield, wt. percent | 80.0 | 87.5 | 90.6 | 87.6 |
| Overall Material Balance, Loss wt. percent | 2.0 | 3.7 | 2.4 | 2.7 |
| Percent of theoretical NaNO$_2$ | 75 | 105 | 105 | 75 |
| Percent of theoretical Air | 62.6 | 0.0 | 43.7 | 42.2 |
| Percent of theoretical Sulfuric Acid | 120.1 | 93.2 | 90.3 | 156.3 |
| Production rate: lbs. per hr. per gal. reactor volume | 17.9 | 19.7 | 208.0 | 216.8 |
| Product Concentration in slurry leaving reactor, wt. percent | 7.1 | 9.4 | | |

| | Run Number 6 | (Conventional Batch Process) |
|---|---|---|
| Product Evaluation: | | |
| Dispersion | O.K. | O.K. |
| Chloroform Insoluble, wt. percent | 0.03 | 0.13 |
| Moisture, wt. percent | 0.27 | 2.87 |
| Melting Point, °C | 156–158 | 151–154 |
| Ash, wt. percent | 0.099 | 0.117 |
| Color | 5 | 6 |

In each case, the pressure existing at the top of the reaction zone—where the product is withdrawn through a 1-inch pipe—is essentially that of the atmosphere.

Thus it is apparent that there has been provided, according to the invention, an outstanding process for oxidizing alkali metal dialkyl dithiocarbamates to the corresponding tetraalkyl thiuram disulfide.

While the invention has been described in conjunction with particular examples thereof, alternatives, modifications, and variations will be apparent to those skilled in the art in light of the foregoing description. Accordingly, it is intended to embrace all such alternatives, modifications, and variations, as fall within the spirit and broad scope of the appended claims.

I claim as my invention:

1. A continuous process for the nitrite oxidation of an alkali metal dialkyl dithiocarbamate to the corresponding tetraalkyl thiuram disulfide which comprises:
   continuously introducing into a reaction zone a dilute aqueous solution of a mineral acid, in an amount sufficient to maintain the pH of said reaction zone and of the effluent from said zone below about four;
   maintaining at least a portion of said reaction zone under conditions of intense agitation to thereby provide an environment favoring oxidation of said alkali metal dialkyl dithiocarbamate to tetraalkyl thiuram disulfide without substantial by-product formation;
   continuously introducing into the intensely agitated portion of said reaction zone a dilute aqueous solution of said alkali metal dialkyl dithiocarbamate and a nitrite oxidant comprising a member selected from the group of alkali metal nitrites and lower alkyl nitrites;
   and withdrawing from said reaction zone an effluent containing said tetraalkyl thiuram disulfide product.

2. Process of claim 1 including the step of continuously introducing into said reaction zone a molecular oxygen-containing gas.

3. Process of claim 2 wherein said molecular oxygen-containing gas is oxygen.

4. Process of claim 2 wherein said molecular oxygen-containing gas is air.

5. Process of claim 2 including the steps of recovering nitrogen oxides from said effluent and cycling said nitrogen oxides to the reaction zone.

6. Process of claim 1 wherein said alkali metal dialkyl dithiocarbamate is a sodium di-lower-alkyl dithiocarbamate.

7. Process of claim 6 wherein said sodium di-lower-alkyl dithiocarbamate is sodium dimethyl dithiocarbamate.

8. Process of claim 1 wherein said mineral acid is sulfuric acid.

9. Process of claim 1 wherein said nitrite oxidant is sodium nitrite.

10. Process of claim 2 wherein said molecular oxygen-containing gas is introduced in an amount corresponding to from about 20 to about 50 percent of theoretical; wherein said nitrite oxidant is introduced in an amount corresponding to from about 70 to about 110 of theoretical; and wherein said mineral acid is introduced in a concentration of from about 3 to about 20 percent by weight and in an amount corresponding to at least about 90 percent of theoretical.

11. Process of claim 1 wherein the reactants are maintained in said reaction zone for a period of from about 0.1 to about 3 minutes.

No references cited.

CHARLES B. PARKER, *Primary Examiner.*
ROBERT V. HINES, *Assistant Examiner.*

UNITED STATES PATENT OFFICE
CERTIFICATE OF CORRECTION

Patent No. 3,255,251                  June 7, 1966

William Budd

It is hereby certified that error appears in the above numbered patent requiring correction and that the said Letters Patent should read as corrected below.

Column 2, lines 49 to 53, for the extreme right-hand portion of the formula reading "$Na_2SO$" read -- $Na_2SO_4$ --; column 5, in TABLE II, line 17 thereof, for "Prodect" read -- Product --.

Signed and sealed this 24th day of October 1967.

(SEAL)
Attest:

Edward M. Fletcher, Jr.
Attesting Officer

EDWARD J. BRENNER
Commissioner of Patents